US012729248B2

(12) United States Patent
Bock et al.

(10) Patent No.: US 12,729,248 B2
(45) **Date of Patent: *Sep. 8, 2026**

(54) THERMALLY MODIFIED STARCHES

(71) Applicant: ROQUETTE FRERES, Lestrem (FR)

(72) Inventors: Solène Bock, Lambersart (FR); Jacques Legrand, Verquin (FR)

(73) Assignee: Roquette Freres, Lestrem (FR)

( * ) Notice: Subject to any disclaimer, the term of this patent is extended or adjusted under 35 U.S.C. 154(b) by 440 days.

This patent is subject to a terminal disclaimer.

(21) Appl. No.: 18/264,015

(22) PCT Filed: Feb. 3, 2022

(86) PCT No.: PCT/EP2022/025037

§ 371 (c)(1),
(2) Date: Aug. 2, 2023

(87) PCT Pub. No.: WO2022/167152

PCT Pub. Date: Aug. 11, 2022

(65) Prior Publication Data

US 2024/0141076 A1 May 2, 2024

(30) Foreign Application Priority Data

Feb. 4, 2021 (FR) ....................................... 2101079

(51) Int. Cl.
*C08B 30/12* (2006.01)

(52) U.S. Cl.
CPC .................................... *C08B 30/12* (2013.01)

(58) Field of Classification Search
CPC ................................ C08B 30/12; C08B 31/04
See application file for complete search history.

(56) References Cited

U.S. PATENT DOCUMENTS 6,221,420 B1 4/2001 Thomas et al.
6,531,592 B1 3/2003 Fuertes et al.
2001/0017133 A1 8/2001 Chiu

FOREIGN PATENT DOCUMENTS

CN 102993319 A 3/2013
WO 2014/042537 A1 3/2014
WO 2020139997 A1 7/2020

*Primary Examiner* — Layla D Berry

(57) ABSTRACT

The invention relates to a thermally modified starch produced via the acid route, characterized in that it has a free citrate content of less than 0.05% and a fixed citrate content of between 0.12 and 0.16% and/or a reduction of between 2 and 10° C. of the gelatinization temperature at RVA peak viscosity, and/or a sedimentation volume of between 15 and 35 mL.

7 Claims, 3 Drawing Sheets

THERMALLY MODIFIED STARCHES

The invention relates to a thermally modified starch produced via the acid route, characterized in that it has a free and fixed citrate content, a lower gelatinization temperature at peak viscosity and a level of sedimentation that are all very entirely particular.

The invention also relates to a thermally modified starch produced via the acid route, having a coloring, expressed in L*(lightness) and in Yl (yellow), on the order of that of native starches.

The invention also relates to a particular method for producing such thermally-modified starches at acidic pH, which starch has stabilized viscosity following this heat treatment.

The acid treatment here refers to a treatment of the starch in the dry phase at a pH of 4, with a sodium citrate powder and citric acid.

Such thermally modified starches then find a use as texturing and thickening agents in numerous food applications.

FIELD OF THE INVENTION

Synthesized biochemically, a source of carbohydrates, starch is one of the most widespread organic materials in the plant kingdom, where it constitutes organisms' nutrient reserves.

Starches have always been used in the food industry, not only as a nutritional ingredient but also for their technical properties, as a thickening agent, binder, stabilizer or gelling agent.

For example, native starches are used in preparations requiring cooking. Corn starch, in particular, forms the basis of "powders for flan".

Since it is rich in amylose, it retrogrades and therefore gels strongly. It makes it possible to obtain firm flans after cooking and cooling. It is also suitable for custards.

However, those cannot be used in pastries intended to be frozen since, on defrosting, the phenomenon of syneresis, which is reflected in the expulsion of water, destroys the texture of the custard.

Thus, in its native state, starch has limited applicability due to syneresis, but also due to:

- its low resistance to shear stresses and to heat treatments,
- its limited processability, and
- its low solubility in common organic solvents.

Thus, in order to meet today's demanding technical requirements, the properties of starch have to be optimized by various methods known as "modification".

These main modifications therefore aim to adapt the starch to the technical constraints resulting from cooking, but also from freezing/thawing, from appertization or sterilization, and to make it compatible with modern food (microwaves, instant meals, "high temperatures", etc.).

Starch modification therefore aims to correct one or more of the abovementioned defects, thereby improving its versatility and meeting the needs of consumers.

Techniques for modifying starch have generally been classified into four categories: physical, chemical, enzymatic and genetic, the ultimate goal being to produce various derivatives with optimized physicochemical properties.

Chemical and physical modifications are most commonly implemented.

Chemical treatment consists of introducing functional groups into the starch, which alters its physicochemical properties in a noteworthy manner. Indeed, such modifications of granular native starches profoundly alter their behavior in terms of gelatinization, bonding and retrogradation.

Generally, these modifications are made by chemical derivatization, such as esterification, etherification, crosslinking or grafting.

However, chemical modifications are less sought-after by consumers in food applications (also for environmental reasons), even if some modifications are considered to be safe.

Various physical modifications are thus proposed, for example:

- heat moisture treatment (HMT), consisting of treating the starch at controlled humidity levels (22-27%) and at high temperature, for 16 hours, in order to alter the structure and physicochemical properties of the starch;
- annealing, consisting of treating the starch in an excess of water at temperatures below the gelatinization temperature, in order to come close to the glass transition temperature;
- high-pressure processing (HPP), by means of which the amorphous regions of the starch granule are hydrated, leading to a distortion of the crystalline parts of the granule and promoting the accessibility of said crystalline regions to water;
- glow discharge plasma treatment, which generates, at ambient temperature, high-energy electrons and other highly active species. Applied to the starch, these active species excite the chemical groups in the starch and cause significant crosslinking of the macromolecules;
- osmotic pressure treatment (OPT), carried out in the presence of solutions with a high content of salts. The starch is suspended in sodium sulfate in order to produce a uniform suspension.

The starch goes from type B to type A after treatment, thereby acquiring a gelatinization temperature which increases significantly;

- "thermal inhibition" treatment. Generally, thermal inhibition means dehydrating a starch until it reaches the anhydrous or substantially anhydrous state (i.e. <1% humidity), then a heat treatment at more than 100° C. for a sufficient period of time to "inhibit" the starch, in this case to afford it properties of crosslinked starches. Moreover, it is necessary to place the starch under pH conditions which are at least neutral to preferentially alkaline, before carrying out the step of forced dehydration.

An alternative to "thermal inhibition" treatment has been proposed in the solvent phase and consists of heating a non-pre-gelatinized granular starch in an alcohol-based medium in the presence of a base and salts at a temperature of 120° to 200° C. for 5 minutes to 2 hours.

Regardless, the thermal inhibition process thus leads to obtaining a starch paste having properties of increased resistance to viscosity breakdown, and a non-cohesive texture.

The technical field to which the invention belongs is that of thermal inhibition treatment of starch without an aqueous-alcoholic solvent.

In this particular technical field, mention may more particularly be made of U.S. Pat. No. 6,221,420, which describes a thermally inhibited starch obtained by dehydration then heat treatment.

The main steps are:

- dehydration of the starch to a water content of less than 1%, carried out at a temperature comprised between 100 and 125° C., then heat treatment of the dry starch thus obtained, at approximately 140° C., in a reactive fluidized bed, for a duration of the order of 20 hours.

Preferentially, before the step of dehydrating the starch, it is recommended to perform a step of alkalinization of the starch, making it possible to bring the pH of the starch suspension to a value comprised between 7 and 10, preferably comprised between 8 and 10.

At this stage, before the step of dehydration proper which precedes the inhibition step, the water content of the starch (as demonstrated by way of examples) is then comprised between 8 and 10%.

U.S. 2001/0017133 describes a similar method, wherein the starch is also dehydrated below 125° C. before the inhibition process is begun (at a temperature of more than 100° C., preferentially of between 120 and 180° C., more preferentially of between 140 and 160° C.) for a duration of up to 20 hours, preferentially of between 3 hours 30 and 4 hours 30.

Before the dehydration step, the conventional alkalinization step leads to a starch suspension having a pH value comprised between 7.5 and 11.2, preferably comprised between 8 and 9.5%, and a water content comprised between 2 and 15%.

A variant was proposed in patent application WO 2014/042537, which variant relates to heating an alkaline starch at temperatures of between 140 and 190° C. while ensuring that the inhibition method is initiated and carried out in the presence of a sufficient amount of water, that is more than 1% water.

In other words, this method recommends the thermal inhibition of a starch which has been alkalinized beforehand without carrying out a dehydration step.

The starch preparation or the starch is thus brought to a pH of between 9.1 and 11.2, preferentially to a value on the order of 10, and the moisture is adjusted to between 2 and 22%, preferentially between 5 and 10%.

The thermal inhibition is subsequently carried out directly on this powder or this starch, at a temperature comprised between 140 and 190° C., preferentially between 140 and 180° C., for a duration of 30 minutes.

Another alternative has been proposed, contrarily by lowering the pH of the treated starch before thermal inhibition. Indeed, a major drawback is due to the fact that high pH levels tend to increase the browning of the starch during the heating step.

Thus, in patent application WO 2020/139997, a step is described for preparing the starch which successively consists of:

preparing a starch milk, bringing the starch milk thus prepared to a pH of between 5 and 6.5, by neutralization if necessary, adding an acidic buffer, and adjusting the pH.

It is only then the actual heat treatment step is carried out, comprising a dehydration step and a thermal inhibition step.

In this patent application, it is essential to first bring the starch milk to a pH value between 5 and 6.5. Either the starch already has this pH value, considered to be its natural pH value, or a step of "neutralization" (by adding acid or base) to reach this pH range is carried out. This step can take up to 24 hours.

Then a pH buffer of citrate or citric acid is added to bring the pH of the starch milk to a pH value of between 4 and 6. This step may take up to 24 hours more.

Finally, in order to manufacture a thermally inhibited starch, it is taught in this patent application to carry out the dehydration and the thermal inhibition of the starch milk thus treated. This step can take up to 4 hours of reaction time.

Finally, it is established that this method makes it possible to obtain thermally inhibited starches that are whiter and that have improved taste compared to thermally inhibited starches prepared by conventional route, that is to say after alkaline impregnation.

Yet there is still room for improvement in this method for preparing thermally inhibited starches. Indeed, it has the disadvantage, from the point of view of its implemented method, of having to carry out the impregnation of the starch milk in an acid medium only after having finely controlled the initial pH of the starch.

Then, as will be demonstrated below, a treatment of this type leads to the production of thermally inhibited starches having a high fixed citrate content, on the order of more than 0.2%, reflecting a significant degree of functionalization.

From the foregoing, there is therefore a need to have an original method for inhibiting starch, making it possible to further reduce the reaction time, by carrying out the impregnation directly on the starch, and by reducing the actual thermal inhibition time, so as to lower the citrate content to values much lower than 0.2%, reflecting a sufficient degree of functionalization for the targeted applications.

DESCRIPTION OF THE INVENTION

Thus, the invention relates to a thermally modified starch produced via the acid route, characterized in that it has a free citrate content of less than 0.05% and a fixed citrate content of between 0.12 and 0.16%.

Advantageously, the thermally modified starch according to the present invention has:

a lowering of the gelatinization temperature at peak RVA viscosity by between 2 and 10° C., and/or a sedimentation volume of between 15 and 35 mL.

More particularly, this thermally modified starch has a coloring expressed as an L*value of between 96 and 98, and a Yl value of between 6 and 13.

The assaying of the citrates of the thermally modified starches of the invention is carried out by HPLC on the washed and hydrolyzed product, according to the conditions as presented below.

The assaying of the free citrates makes it possible to validate the use of said thermally starches in "Clean Label" applications, and that of fixed citrates makes it possible to determine the degree of functionalization expressed by the products of the thermal reaction via the acid route on the starches.

The products of the invention have a free citrate content of less than 0.05%, which is less than the free citrate levels of products of the same category of the prior art (such as those obtained according to the method taught by international patent application WO 2020/139997 or on the market), the measured value of which is between 0.07 and 0.09%.

It is necessary to have a substantial washing thereof so that their free citrate content drops to a value of less than 0.01%.

As for the assaying of the fixed citrates, obtained after washing and hydrolysis, the thermally modified starches in accordance with the invention have a fixed citrate content of between 0.12 and 0.16%, whereas the products of the same category of the prior art (such as those obtained according to the method taught by the international patent application WO 2020/139997 or on the market) have values on the order of 0.24 to 0.39%.

The viscosity measurements of the heat-modified starches in accordance with the invention are carried out on an RVA 4800 device and allow a lowering of the gelatinization temperature at peak RVA viscosity by between 2 and 10° C.

The thermally modified starches according to the invention are also characterized by their sedimentation capacity.

The test is carried out in test specimens, and the lower the settling volume, the higher the degree of functionalization.

The settling volume of the products in accordance with the invention is between 15 and 35 mL, which reflects a high crosslinking level.

The thermally modified starches according to the invention are finally characterized by a coloring equivalent to that of native starches which served as a basis for their manufacture.

This is manifested by an L*value of between 96 and 98, and a Yl value of between 6 and 13.

The thermally modified starches are capable of being obtained by a method comprising the steps of:

(i) determining the amount of water to be added to the powder starch so as to achieve a total moisture of 20% by weight, (ii) adding into this amount of water the sodium citrate and citric acid powder so as to obtain a buffer solution having a pH of 4, (iii) mixing the powdered starch and the buffer solution thus obtained and allowing it to stabilize for a period on the order of 30 minutes to 24 hours, (iv) drying to an equilibrium moisture on the order of 13%, (v) heating to a temperature of 170° C., (vi) resuspending, correcting the pH, washing and again drying the thermally modified starches thus obtained.

The starch to be used in the method of the invention may be of any origin, for example corn, waxy corn, amylomaize, wheat, waxy wheat, pea, faba bean, green bean, potato, waxy potato, tapioca, waxy tapioca, rice, konjac, taken alone or in a mixture.

Preferentially, corn starch, more particularly waxy corn starch (with a high amylopectin content, as will be exemplified below) will be chosen.

The method according to the invention asks to determine the amount of water to be added to the starch so as to achieve a total moisture of 20% by weight in the mixture, then to add into this amount of water, the sodium citrate and citric acid powder so as to obtain a buffer solution having a pH of 4. As will be exemplified below, half of the added water is used to dissolve the citric acid and sodium citrate dihydrate beforehand.

Figure 1:
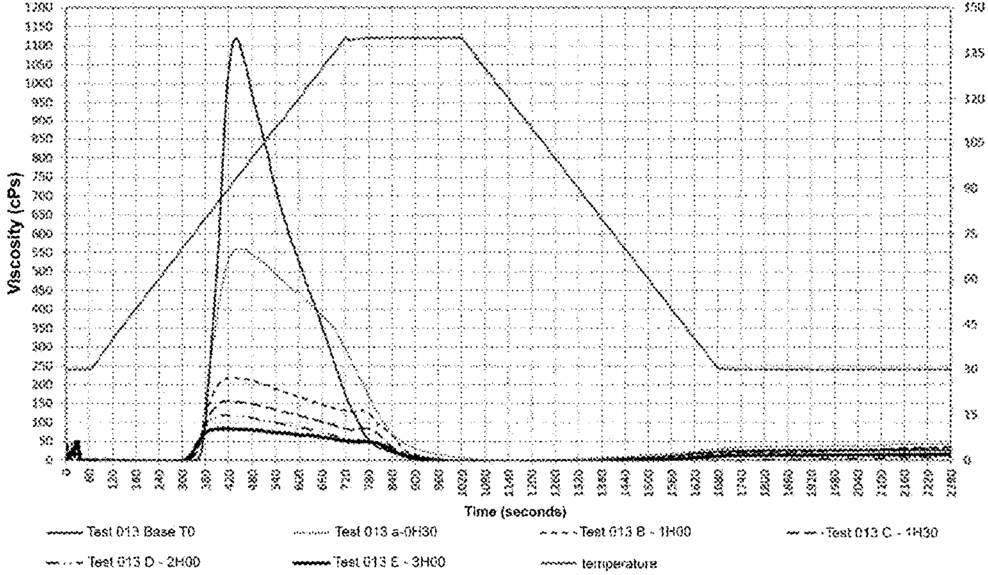
FIG. 1 shows the viscosity measurements of the washed products.

It is then left to stabilize for a period on the order of 30 min to 24 hours.

The preparation is dried at an equilibrium moisture on the order of 13%.

The drying may be carried out at 60° C. in a laboratory Retsch dryer, but also in a hood with its natural ventilation at room temperature, or in a pilot/industrial dryer, at a temperature of more than 100° C.

After grinding and drying at 60° C., the actual heat treatment is carried out.

As will be exemplified below, the heat treatment is carried out at a temperature of 170° C., for a reaction time ranging from 0.5 to 3 hours. This kinetics makes it possible to vary the degree of functionalization of the thermally modified starches thus prepared (the more functionalized the starches are, the stronger the conditions of use, that is to say acidic pH, high shear, high temperature).

Heating can be carried out in a ventilated oven, or a pilot or industrial apparatus of the VOMM Turbodryer type or in a fluidized bed reactor.

After heat treatment, the products are resuspended at 36% by weight of dry matter. The pH is rectified with sodium hydroxide to between 5.5 and 6, then is finally filtered, dried and ground.

The thermally modified starches thus obtained will advantageously be used, depending on their respective properties, as a thickening agent or texturizing agent in food applications.

The invention will be better understood with the aid of the following examples, which are intended to be illustrative and non-limiting.

Materials and Methods

Substrates

Waxy corn starch marketed by the applicant company under the brand name WAXILYS® produced at its Beinheim site.

Its features are:

water content: 12.4% pH: 5.4 conductivity: 223 μS

Coloration: L*=97.6; Yl=8.11

The two products used for the pH 4 buffer are below.

| NAME | | CAS | Raw Formula | Mw (g/mol) |
|---|---|---|---|---|
| 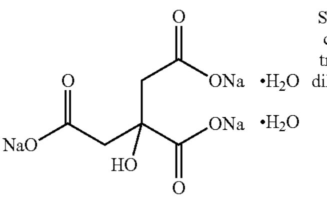 | Sodium citrate tribasic dihydrate | 6132-04-3 | $C_6H_5Na_3O_7 \cdot 2H_2O$ | 294.1 |
| 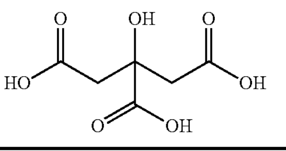 | Citric acid, Anhydrous | 77-92-9 | $C_6H_8O_7$ | 192.12 |

Measurement of Conductivity and pH

Conductivity

The method implemented herein is adapted from the European Pharmacopoeia—current official edition—Conductivity (§ 2.2.38).

Materials:

KNICK 703 electronic conductivity meter, also equipped with its measuring cell and verified according to the procedure described in its instruction manual.

Procedure:

A solution containing 20 g of sample in powder form and 80 g of distilled water having a resistivity of greater than 500,000 ohms·cm is prepared.

The measurement is carried out at 20° C. using the conductivity meter, referring to the procedure indicated in the instrument's user manual.

The values are expressed in microSiemens/cm (μS/cm) or milliSiemens/cm (mS/cm).

pH

The method implemented here is adapted from the European Pharmacopoeia—current official edition—pH (§ 2.2.3).

A suspension of the sample to be analyzed at 20% (P/P) is prepared, and the pH value is determined using a laboratory pH meter, referring to the procedure indicated in the machine's manual. The pH is expressed to within 0.01 units.

Citrate Measurements by HPLC

The citrates are assayed:

- directly after heat treatment, on washed and dried products (measurement of free citrates) then,
- after hydrolysis (measurement of the fixed citrates) according to the following methods.

Assay Method

After separation by ion exchange chromatography, the citrate ion is detected by conductimetry. Quantification is done by the internal standard method.

A high-performance liquid chromatography assembly is used for equipment, composed of:

- An ICS 2100 Thermofisher system;
- A sampler for maintaining samples at 10° C. (TSP AS-AP type);
- An AERS 500-ultra suppressor;
- A Thermo AS11 HC 250*4 mm column with an AG11-HC 4*50 mm pre-column.
- filters for ion chromatography—IC 0.45 μm-Pall.

Use is made, as reagents, of:

- HPLC-grade water
- Sodium citrate tribasic dihydrate from Sigma
- Trifluoroacetic acid from Sigma
- Internal standard solution: trifluoroacetic acid solution at 400 mg/L
- 2N hydrochloric acid from Merck
- EGC-KOH cartridge from Thermo.

The procedure is as follows:

Solvent A: HPLC-grade water,

Elution program:

| Time (min) | Flow rate (mL/min) | KOH |
|---|---|---|
| 0 | 1.3 | 1.5 |
| 15 | 1.3 | 1.5 |
| 28 | 1.3 | 1.2 |
| 48 | 1.3 | 28 |
| 60 | 1.3 | 40 |
| 60.1 | 1.3 | 60 |
| 67 | 1.3 | 60 |
| 67.1 | 1.3 | 1.5 |
| 77 | 1.3 | 1.5 |

Volume injected: 25 μL

Column temperature: 36° C.

Analysis time: 77 min

Sample temperature: 10° C.

ASRS: 193 mA

Calibration

- Prepare 6 curve points.
- Weigh×mg of sodium citrate, that is to say x between 10 and 250 mg and adjust with 500 mL of water. Stir.
- Sample 0.5 mL, add 0.5 mL of internal standard and complete to 20 mL with 1 mM sodium hydroxide.
- Filter and inject.
- Calculate the mass of the chloride standards (weight of sodium chloride (Mw of the ion/Mw of salt).

Draw the calibration curve: ratio of peak heights (=chloride standard weight/internal standard weight).

Sample

Weigh 100 mg of sample+0.5 mL of internal standard with 20 mL of water. Filter. Inject.

Washing and Drying

Approximately 20 g of the sample to be analyzed and 200 mL of demineralized water are introduced into a 250 mL beaker. It is covered with a watch glass and stirred for 20 minutes using a magnetic stirrer. The next step is to filter in a Buchner funnel with a diameter of 150 mm equipped with a white-band Durieux filter #111, with a diameter of 150 mm or equivalent.

The filtrate is placed in a 250 mL beaker, dispersed in 200 mL of demineralized water and stirred for 20 minutes. It is again filtered and rinsed with 200 mL of demineralized water.

The filtered product is dried in a laboratory oven overnight, and then it is ground up to avoid lumps.

Hydrolysis

In the 250 mL flat-bottomed, ground-neck flask, an accurately weighed test specimen "P" of the sample to be analyzed is introduced. An amount of distilled water equal to (100−P), 100 mL of 2N hydrochloric acid and a few boiling regulators (pumice stone in grains) are added. It is placed in the electromantle with a reflux condenser and left to sit 45 minutes after boiling. It is then cooled and then neutralized with 40% soda solution up to pH 7.

Expression of Results

The citrate ion content in % is determined by the following equation:

$$Q/P \times 100$$

where:

Q=amount of citrate read on curve (mg)

P=weight of the sample in mg.

Measuring the Viscosity of a Starch Suspension Using the Rapid Viscometer Analyzer (RVA) 4800

This measurement is carried out at pH 4 under predetermined concentration conditions and according to a suitable temperature/time analysis profile.

Preparation of the Citrate Buffer at pH 4

- prepare 800 mL of distilled water,
- add 9.838 g of sodium citrate,
- add 12.782 g of citric acid,
- adjust the solution with NaOH or HCl to reach the pH of 4,
- complete to 1 liter with distilled water.

The product to be analyzed is prepared in the following manner:

A mass of 1.37 g of the dry product to be analyzed is placed directly in the viscometer bowl, and pH 4 citrate Buffer solution is introduced until a mass equal to 28.00±0.01 g is obtained.

The time/temperature and speed analysis profile in the RVA is then carried out as follows:

TABLE 1

| Time hh:mm:ss | | |
|---|---|---|
| 00:00:00 | Temperature ° C. | 30 |
| 00:00:00 | Speed of rotation (RPM) | 100 |
| 00:00:10 | Speed of rotation (RPM) | 500 |
| 00:00:20 | Speed of rotation (RPM) | 960 |
| 00:00:30 | Speed of rotation (RPM) | 160 |
| 00:01:00 | Temperature ° C. | 30 |
| 00:12:00 | Temperature ° C. | 140 |
| 00:17:00 | Temperature ° C. | 140 |
| 00:28:00 | Temperature ° C. | 30 |
| 00:38:00 | Temperature ° C. | 30 |

End of test: 00:38:05 (hh:mm:ss)
Initial temperature: 30° C. ± 0.5° C.
Data acquisition interval: 2 seconds
Sensitivity: low The results of the measurements are given in RVU (unit used to express the viscosity obtained on the RVA), it being known that 1 RVU unit=12 cPoises (cP).

As a reminder, 1 cP=1 mPa·s.

On the graphs, the results are expressed in cPoises.

The temperature at peak swelling is added to the analysis profile between 2 and 17 minutes.

Sedimentation Test

The product is dispersed in an aqueous medium and the settled volume is measured.

Solution A

Zinc chloride: 10 g

Ammonium chloride: 26 g

Distilled water: qsp 100 mL

In a 250 mL jar, introduce a 1.0 g test specimen of the anhydrous product to be analyzed. Add 100 mL of solution A, cover with cap, homogenize and place in a water bath for 10 min. Cool in a cold water bath, homogenize again, transfer into a 100 mL test tube and measure the settled volume after 24 hours. The settled volume, expressed in mL, is given by the following formula: settled volume of starch/total volume)×100

Color Measurement

The colorimetric measurement is based on the opposite-color theory which specifies that the responses of the cones (the cells of the retina of the human eye responsible for seeing color) to the colors red, green and blue are recombined into opposite signals "black-white", "red-green" and "yellow-blue" when transmitted to the brain by the optic nerve.

This measurement is based on the color scales widely used in the food and polymer industries, called the CIELAB L*, a*, b* scales.

The L*, a* and b* scales are defined as follows:

- axis "L*" (lightness): 0 corresponds to black, 100 corresponds to white
- axis "a*" (red-green): the positive values are assigned to red, the negative values are assigned to green; 0 is neutral
- axis "b" (yellow-blue): the positive values are assigned to yellow; the negative values are assigned to green; 0 is neutral.

The index "L*" therefore has a value of between 0 and 100, while the indices "b*" and "a*" have no numerical limitations. The measurement apparatus is conventionally a Colorflex EZ spectrocolorimeter, following the manufacturer's specifications (version of the manual 1.2 of August 2013 for firmware CFEZ version 1.07 and above—see pages 17 and 38).

The measurement is carried out in a 64 mm glass sample cup wherein the sample is inserted so as to fill the glass cup halfway in order to have sufficient material to cover the surface in contact with the rays (for uniformity of measurement).

EXAMPLE

Example 1: Preparation of Thermally-Modified Starches

In the THERMOMIX 3300 VorWerk bowl, 500 g of commercial WAXILYS® corn starch is placed. To achieve a total humidity of 20%, 47.88 g of demineralized water must be added. Half of this water is used to dissolve the sodium citrate and citric acid so as to obtain a pH of 4. This solution is sprayed onto the starch as it is being stirred, the remainder of the water is then added in the Thermomix.

The mixture is left to mature for 24 hours and then dried on a RETSCH dryer at 60° C. to an equilibrium moisture on the order of 13%

It is ground in a Thermomix mill in order to unclump the starch and avoid the formation of aggregates.

Measurements: Humidity, pH, Conductivity, Coloration (L* and Yl)

Heat Treatment 40 g of sample is weighed and placed in an aluminum cup for a METTLER LJ16 scale (moisture measurement scale).

The cup is inserted into the MEMMERT ventilated oven previously heated to 170° C. The chronometer is triggered once the cups have finished going in, and the springs as a function of the chosen reaction kinetics.

Washing and Rectifying the pH of the Products After Reaction by Resuspending

- the sample is resuspended at 36% of DM in demineralized water,
- the pH is corrected between 5.5 and 6 by NaOH,
- it is filtered on a frit with porosity 3,
- the cake is dried under a ventilated hood for one night at ambient temperature,
- the sample is ground (IKA) so as to unclump it and make it homogeneous.

Measurements: Humidity, pH, Conductivity, Coloration (L* and Yl), Viscosity RVA 4800 on Washed Products and Sedimentation Test.

Results

Physical/Chemical Measurements

On the samples taken during the reaction at 170° C., before washing, the following are measured:

- moisture
- pH
- conductivity in μS
- coloring and presented in table 1 below

TABLE 1

| Tests | Heat treatment Hours | Humidity (%) % | At 20% DM pH | At 20% DM Conductivity μS | Color measurements on COLORFLEX Hunter Lab L* | Color measurements on COLORFLEX Hunter Lab YI |
|---|---|---|---|---|---|---|
| Waxy corn base | 0 | 10.59 | 4.15 | 501 | 97.47 | 8.18 |
| Test 013 A | 0.5 | 0.11 | 4.69 | 447 | 97.35 | 7.86 |
| Test 013 B | 1 | 0.21 | 5.25 | 327 | 96.89 | 8.49 |
| Test 013 C | 1.5 | 0.1 | 5.35 | 323 | 96.62 | 9.47 |
| Test 013 D | 2 | 0.1 | 5.39 | 328 | 96.03 | 10.51 |
| Test 013 E | 3 | 0.1 | 5.41 | 332 | 94.86 | 13.31 |

During the reaction with the citrate buffer (pH 4) placed directly in powder form in a Waxy corn starch milk, we observe:

- an increase in pH which goes from 4.15 to 5.41 after 3 hours at 170° C.
- a decrease in conductivity at the start of the reaction by about 174 μS, then a stabilization after 1 h of reaction at approximately 327 to 332 μS.
- a slight increase in the coloration after 3 hours of reaction at 170° C. which takes the Yl (Yellow) from 8.18 to 13.31.

Washing the Products after Reaction

The measurements are carried out on washed products according to the protocol indicated above and presented in the following tables 2 and 3.

TABLE 2

| Tests | Heat treatment Hours | Suspension at 36% DM pH | Suspension at 36% DM Conductivity μS | pH correction by NaOH pH | pH correction by NaOH Conductivity μS |
|---|---|---|---|---|---|
| Test 013 A | 0.5 | 4.68 | 493 | 6.0 | 610 |
| Test 013 B | 1 | 5.00 | 478 | 6.2 | 542 |
| Test 013 C | 1.5 | 5.11 | 486 | 6.3 | 607 |
| Test 013 D | 2 | 5.24 | 432 | 6.0 | 654 |
| Test 013 E | 3 | 5.26 | 455 | 6.1 | 491 |

TABLE 3

| Tests | Heat treatment Hours | Humidity (%) % | At 20% DM pH | At 20% DM Conductivity μS | Color measurements on COLORFLEX Hunter Lab L* | Color measurements on COLORFLEX Hunter Lab YI |
|---|---|---|---|---|---|---|
| Test 013 A | 0.5 | 13.8 | 6.2 | 287 | 97.1 | 6.4 |
| Test 013 B | 1 | 13.9 | 6.4 | 242 | 96.5 | 7.1 |
| Test 013 C | 1.5 | 13.5 | 6.5 | 254 | 96.1 | 8.2 |
| Test 013 D | 2 | 13.6 | 5.6 | 390 | 95.7 | 9.4 |
| Test 013 E | 3 | 13.6 | 6.2 | 204 | 94.7 | 12.3 |

Products after washing are obtained whose pH is between 5.6 and 6.5 and whose conductivity is between 204 μS and 390 μS.

The colorings in Yl (yellow) are between 6.4 and 12.3. By comparison, the native Waxy base has a Yl of 8.11.

Measuring the Viscosity of the Washed Products Using RVA 4800 at 140° C.

The results are shown in the graph in FIG. 1.

It appears that the treatment at 170° C. of the waxy corn starch impregnated at pH 4 with a citrate/citric acid medium causes the gelatinization temperature at peak viscosity to decrease.

Figure 2:
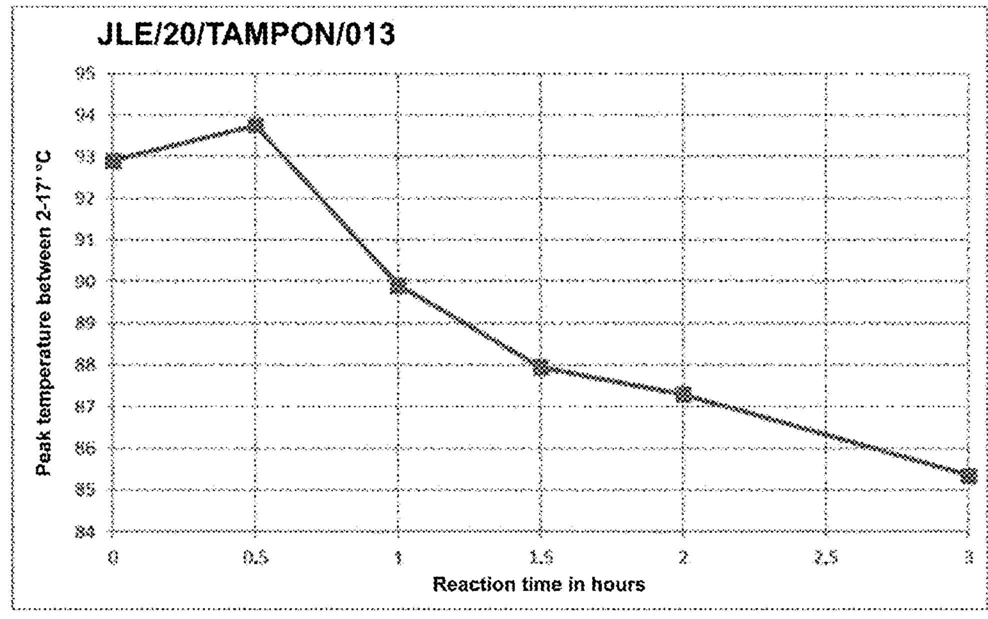
FIG. 2 shows the gelatinization temperature measurement at peak gelatinization between 2 and 17 minutes.

FIG. 2 shows the gelatinization temperature measurement at peak gelatinization between 2 and 17 minutes, and it is observed that the peak gelatinization temperature decreases during the reaction at 170° C. between 2 and 10° C.

Within the meaning of the invention, thermally modified starches of interest are therefore obtained after 0.5 hour of reaction at 170° C.

Sedimentation Test

Figure 3:
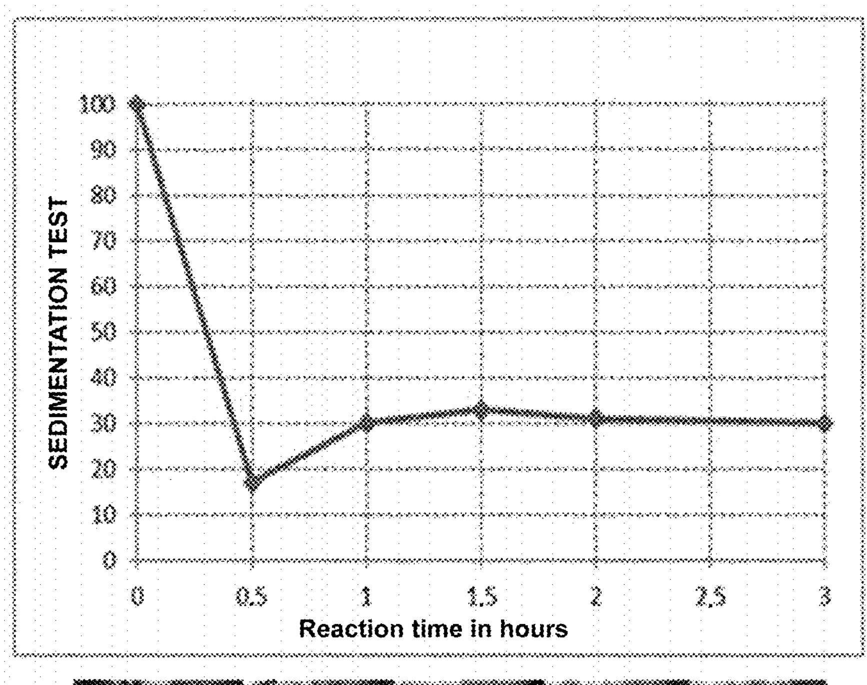
FIG. 3 shows the results of sedimentation tests.
Figure 3:
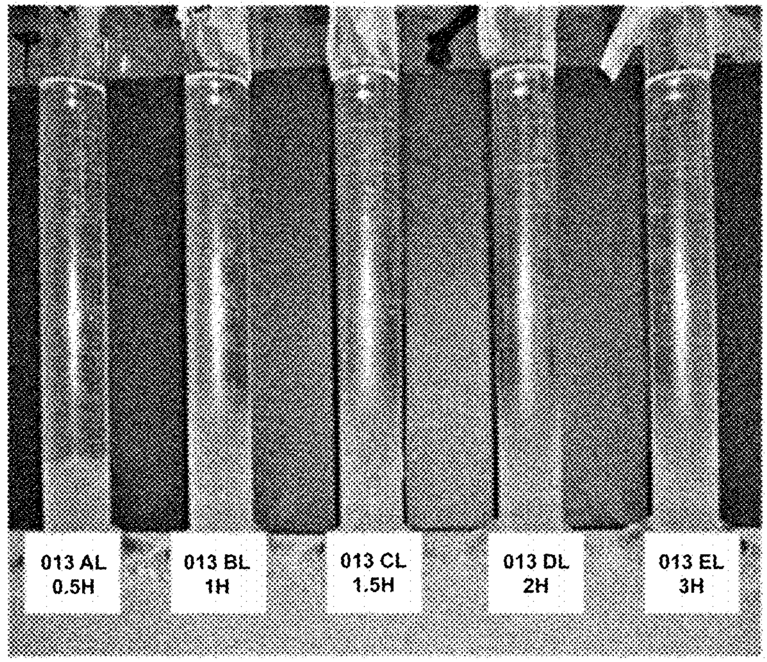

The results are presented in table 4 below and FIG. 3.

TABLE 4

| Tests | Heat treatment Hours | Settling volume |
|---|---|---|
| Waxy corn base | 0 | 100 |
| Test 013 A | 0.5 | 17 |
| Test 013 B | 1 | 30 |
| Test 013 C | 1.5 | 33 |
| Test 013 D | 2 | 31 |
| Test 013 E | 3 | 30 |

After 0.5 hours of reaction, products that are already highly functionalized are obtained. Beyond this, the degree of functionalization drops, but remains constant.

Citrate Assay

The results are presented in table 5 below (with, in comparison, the free and fixed citrate contents of products sold by TATE & LYLE and products according to the teachings of patent application WO 2020/139997).

TABLE 5

| Test | Free citrates (% dry/dry weight) | After hydrolysis (% dry/dry weight) |
|---|---|---|
| Waxy starch base | 0.26 | 0.02 |
| Test 013 A | 0.05 | 0.12 |
| Test 013 B | 0.01 | 0.16 |
| Test 013 E | 0.01 | 0.14 |
| CLARIA ® PLUS | 0.08 | 0.36 |
| CLARIA ® ELITE | 0.10 | 0.44 |
| CLARIA ESSENTIAL ® | 0.08 | 0.27 |

It should be noted that the 0.26% free citrate content of the waxy starch base represents the amount of citrate which impregnated the starch and will be used for the heat treatment reaction.

The amount of fixed citrate after reaction at 170° C., for the thermally modified starches of the invention, is 0.12 to 0.16, much lower than that of the inhibited starches obtained according to the method of the prior art.

The invention claimed is:

1. A thermally modified starch produced by an acid treatment with sodium citrate and citric acid, having a free citrate content of less than 0.05% and a fixed citrate content of between 0.12 and 0.16%.

2. The thermally modified starch according to claim 1, having:

a lowering of the gelatinization temperature at peak RVA viscosity by between 2 and 10° C., and/or a sedimentation volume of between 15 and 35 mL.

3. The thermally modified starch according to claim 1, having a coloring expressed as an L* value of between between 94 and 98, and as a YI value of between 6 and 13.

4. The thermally modified starch according to claim 1, wherein the thermally modified starch has a botanical origin selected from the group consisting of corn, waxy corn, amylomaize, wheat, waxy wheat, pea, faba bean, green bean, potato, waxy potato, tapioca, waxy tapioca, rice, konjac taken alone or in mixture.

5. A method for preparing the thermally modified starch according to claim 1, comprising the steps consisting of:

(i) determining the amount of water to be added to the powder starch so as to achieve a total moisture of 20% by weight, (ii) adding into this amount of water sodium citrate and citric acid powder so as to obtain a buffer solution having a pH of 4, (iii) mixing the powdered starch and the buffer solution thus obtained and allowing it to stabilize for a period of 30 minutes to 24 hours, (iv) drying to an equilibrium moisture of 13%, (v) heating to a temperature of 170° C., (vi) resuspending at 36% by weight of dry matter, correcting the pH to 5.5-6.0 with sodium hydroxide, washing and again drying the thermally modified starch thus obtained.

6. The method according to claim 5, wherein the thermally modified starch has a botanical origin selected from the group consisting of corn, waxy corn, amylomaize, wheat, waxy wheat, pea, faba bean, green bean, potato, waxy potato, tapioca, waxy tapioca, rice, konjac taken alone or in combination.

7. A food composition comprising the thermally modified starch of claim 1.

* * * * *